J. R. EDWARDS & M. C. LAYWELL.
SIGNAL LAMP.
APPLICATION FILED JAN. 15, 1915.

1,169,941.

Patented Feb. 1, 1916.

Inventors
J. ROBERT EDWARDS
MILTON C. LAYWELL

UNITED STATES PATENT OFFICE.

JOSTEN ROBERT EDWARDS AND MILTON C. LAYWELL, OF COLUMBUS, OHIO.

SIGNAL-LAMP.

1,169,941.   Specification of Letters Patent.   Patented Feb. 1, 1916.

Application filed January 15, 1915. Serial No. 2,374.

*To all whom it may concern:*

Be it known that we, JOSTEN ROBERT EDWARDS and MILTON C. LAYWELL, citizens of the United States of America, residing at Columbus, in the county of Franklin and State of Ohio, have invented certain new and useful Improvements in Signal-Lamps, of which the following is a specification.

The present invention relates to improvements in signal lamps of the illuminated box type with perforated faces, for automobiles, and is designed for use at either the front or rear of the automobile or other vehicle upon which it is to be used.

By the utilization of our invention in connection with automobiles we are enabled to provide a signal lamp that is extremely simple in construction and operation, comparatively cheap in cost, but is a comparatively perfect instrumentality for performing the functions of indicating to a succeeding vehicle the direction in which the preceding vehicle, (or when the vehicle carrying the lamp) is about to make a turn, and the lamp also utilizes colored lights, red for the tail light and green when the signal lamp is used at the front of the automobile.

The invention consists in certain novel combinations and arrangements of parts as hereinafter more fully set forth and claimed.

In the accompanying drawings we have illustrated one complete example of the physical embodiment of our invention constructed according to the best mode we have so far devised for the practical application of the principles of the invention.

Figure 1:
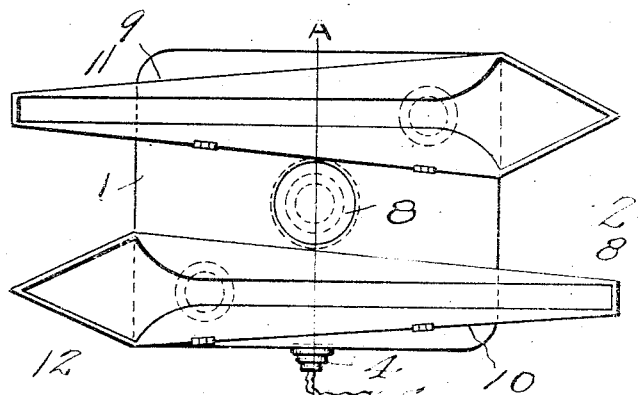
Figure 3:
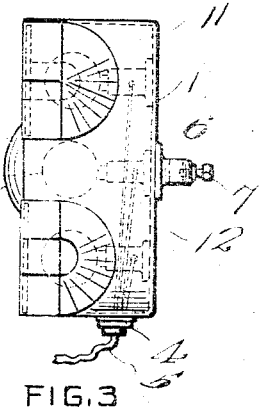
Figure 2:
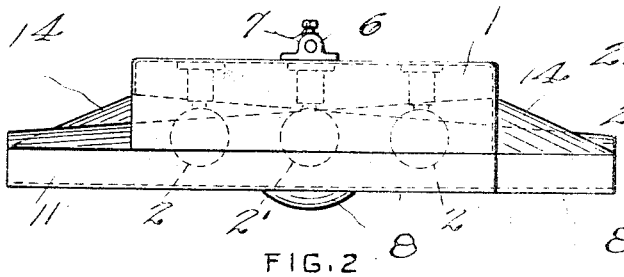
Figure 4:
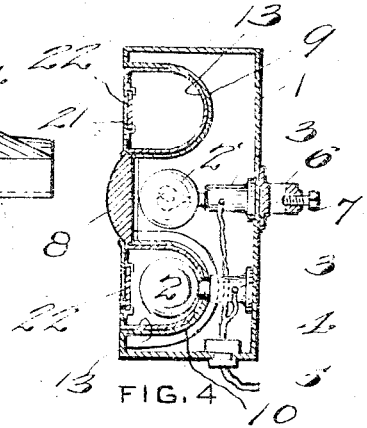
Figure 5:
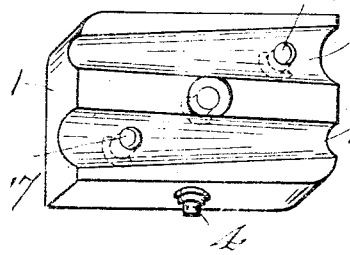
Figure 6:
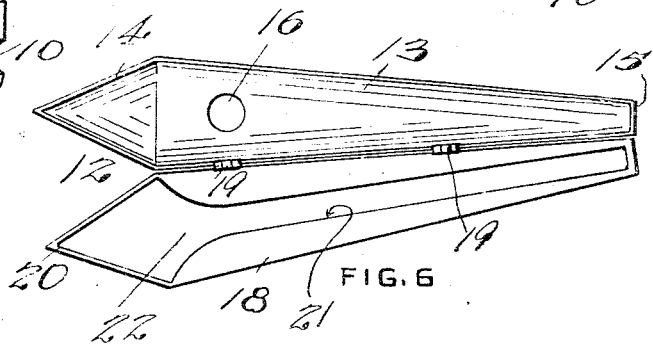

Figure 1 is a front elevation of the signal lamp. Fig. 2 is a top plan view. Fig. 3 is a side elevation. Fig. 4 is a sectional view at line A—A Fig. 1. Fig. 5 is a view of the housing. Fig. 6 is a view of one of the boxes, open.

In the preferred embodiment of our invention we employ a housing 1 preferably made up of suitable metal and rectangular in shape, and adapted to inclose the electric lamps as 2, 2, 2, and their sockets 3, 3, etc. In the bottom wall of the housing a plug 4 is fixed for the wires 5 which convey the electric current to the lamps 2, and on the rear wall of the housing, a bracket 6 is attached which is adapted to be passed over a post and secured thereto by means of the set screw or clamp screw 7. The post for the bracket is attached to a suitable portion of the automobile or its frame, either at the front of the automobile, or at the rear, and in many instances the signal lamp is used both at the front and rear of the automobile. At its center in the front wall, the housing is provided with the usual bull's eye light as 8 illuminated by the lamp 2' in the housing, and it will be understood that this colored lamp may be red at the rear of the vehicle and green at the front for purposes well understood.

In the front wall of the housing, two depressions or grooves 9 and 10 are fashioned, and in Fig. 5 particularly it will be seen that these grooves are, each of them, of diminishing diameter in opposite directions. The walls of the grooves are curved or semi-elliptic in cross section and the grooves are designed to receive, each of them, a peculiarly fashioned, tapered, signal box indicated as a whole by the numbers 11 and 12. The body of each box, as indicated at 13, is formed to neatly fit within the recess or groove of the housing, and the boxes are held in these recesses or grooves in suitable manner. One end of the body of each box is pointed as indicated at 14, the other end being closed by the wall 15, and an opening 16 is provided through which the lamp sockets may project, a complementary opening 17 being provided in the wall of the recesses in the housing. The body of the box has its inner face or surface equipped as a reflector and it may be treated in any of a number of different ways for accomplishing this end. To the reflector or body portion of the box, a lid or cover 18 is hinged at 19. This cover is preferably of opaque material, being of suitable metal, and it is of the general shape of the body, *i. e.* it has a pointed end 20 and diminishes in width, or is tapered to its smaller end.

In the accompanying drawings we have shown the lid or cover cut out in the form of an arrow as 21, but it will be understood that this design may be of other suitable forms, such as a hand with its index finger pointing in the proper direction. This space 21 is closed by a glass 22, and the glass, which is translucent or semi-transparent, may be colored red and frosted for this purpose. With the lamp lighted behind the translucent glass it will be readily understood that the outline of an arrow, red in color, is reproduced in the front or lid of the lamp box, which may be used as a signal to show the direction of travel.

The two lamp boxes are alike in construction and it will be evident that they may be "assembled" in opposite directions in the housing, with either one at the top of the housing, and when the proper lamp is lighted, will indicate as desired. The body part of the two boxes forms the reflectors for the lamps, and the housing for these reflecting parts forms a covering for the lamps and base or foundation for the lamp boxes. The lamp sockets extend through the two openings, one in the groove or recess wall and the other in the reflecting wall of the box, and it will be manifest that the bulbs or lamps 2 may be inserted, after the boxes are located in place, by opening the hinged door or cover of the lamp box.

The automobile is equipped with a four point switch in its lighting system so that all four indications, red, green, right, or left may be made independently of each other, as the green in front and red at the rear may or may not both be in service at the same time. The front and rear lights would of course have independent switch levers or connections, but a single switch lever could be used for the right and left lights or arrows, which of course are never both in use at the same time. The lights in the reflectors or boxes, when used both in front and rear, are connected so that they will be lighted simultaneously with the single operation of the lever and both lights will point in the same direction.

A signal lamp constructed according to our invention it will be noted, is especially thin and compact, but at the same time it offers large clear indicating arrows that may be distinguished readily at usual distances.

What we claim is:—

The combination in a signal lamp with a recessed housing, of a pair of separable oppositely pointed lamp boxes fitted in the housing, each lamp box having a longitudinally tapered body semi-elliptical in cross section and forming a reflecting surface, and an opaque lid to each box having a transparent portion forming an indicator.

In testimony whereof we affix our signatures in presence of two witnesses.

JOSTEN ROBERT EDWARDS.
MILTON C. LAYWELL.

Witnesses:
F. M. GLICK,
MARY WILSON.